United States Patent [19]

Nishikawa et al.

[11] Patent Number: 4,985,499

[45] Date of Patent: Jan. 15, 1991

[54] PRESSURE SENSITIVE ADHESIVE COMPOSITION

[75] Inventors: Makoto Nishikawa; Hideo Takamatsu; Masao Ishii; Shobu Minatono, all of Kashima, Japan

[73] Assignee: Kuraray Company Ltd., Kurashiki, Japan

[21] Appl. No.: 310,052

[22] Filed: Feb. 14, 1989

[30] Foreign Application Priority Data

Feb. 22, 1988 [JP] Japan .................................. 63-40279

[51] Int. Cl.$^5$ ...................... C09J 153/02; C08L 53/02
[52] U.S. Cl. .......................................... 525/89; 525/92
[58] Field of Search ........................................... 525/89

[56] References Cited

U.S. PATENT DOCUMENTS 4,797,322 1/1989 Huddleston ........................... 525/89
4,892,903 1/1990 Himes .................................... 525/89

FOREIGN PATENT DOCUMENTS 211466   2/1987  European Pat. Off. .............. 525/89
281163  12/1986  Japan .
178187   7/1988  Japan .................................... 525/89
178188   7/1988  Japan .................................... 525/89
2115823  9/1983  United Kingdom .................. 525/89

Primary Examiner—Melvyn I. Marquis
Assistant Examiner—David Buttner
Attorney, Agent, or Firm—Oblon, Spivak, McClelland, Maier & Neustadt

[57] ABSTRACT

A pressure sensitive adhesive composition is provided which comprises a tri-block copolymer (a) consisting of aromatic vinyl block-conjugated diene block-aromatic vinyl block in which the conjugated diene moiety is hydrogenated and a block copolymer (b) consisting of an aromatic vinyl block and a conjugated diene block in which the conjugated diene moiety is hydrogenated. The adhesive composition is significantly improved in low temperatures characteristics, adhesion and processability with good adhesion.

8 Claims, No Drawings

PRESSURE SENSITIVE ADHESIVE COMPOSITION

BACKGROUND OF THE INVENTION

1. Field of the Invention

This invention relates to a pressure sensitive adhesive composition which has good adhesive characteristics and good heat resistance and weatherability.

2. Description of the Related Art

From the standpoint of energy and resource savings and pollution control, hot melt-type adhesives have been widely employed instead of solvent-type adhesives in which natural rubber and the like are dissolved in organic solvent. As a typical base polymer of the hot melt-type adhesives there have been used block copolymers comprised of aromatic vinyl block-conjugated diene block-aromatic vinyl block (U.S. Pat. Nos. 3,676,202 and 3,723,170). These copolymers are good with respect to adhesion at normal and low temperatures and flexibility. However, since the copolymers contain the diene block which is unsaturated in nature, they suffer considerable deterioration upon exposure to ultraviolet rays or heat and cannot be used under these circumstances. In order to overcome the drawback of the copolymers, there is known a method wherein the conjugated diene moiety is hydrogenated to reduce the amount of the unsaturated bonds (U.S. Pat. No. 3,427,269). However, the copolymer whose conjugated moiety has been hydrogenated tends to lower in adhesive characteristics including not only adhesion at low temperature, but also adhesion at normal temperatures and adhesion to polyolefins when compared with the non-hydrogenated copolymers. In addition, such hydrogenated copolymer exhibits so a high melt viscosity at high temperatures that processability undesirably lowers. As a result, severe limitation is placed on the use from the standpoint of adhesive characteristics and processability. In order to solve these problems, plasticizers or softeners such as process oils have been in use as described in "Rubber Chem. Technol., 29 492 (1956)". Although adhesive characteristics at low and normal temperatures and processability at high temperatures are improved by incorporation of these additives, adhesion to polyolefins is not improved at all with a considerable lowering of cohesion at relatively high temperatures. Moreover, the oils added sometimes bleed out from the adhesive, thus causing the substrate for the adhesive and adherend to be contaminated therewith. This will eventually bring about the problem that the adhesive greatly changes its characteristics with time. For these reasons, the adhesives of the type set out above are limited in the range of applications.

SUMMARY OF THE INVENTION

An object of the invention is to provide a hot melt-type pressure sensitive adhesive composition which comprises a tri-block copolymer consisting of aromatic vinyl block-conjugated diene block-aromatic vinyl block and which is substantially free of any bleeding without a sacrifice of good adhesive characteristics inherent to the copolymer of the type mentioned above.

Another object of the invention is to provide a hot melt-type pressure sensitive adhesive composition which exhibits improved low temperature characteristics, pressure sensitive adhesive characteristics and processability along with good adhesive characteristics.

The above objects can be achieved, according to the invention, by a pressure sensitive adhesive composition which comprises (a) a tri-block copolymer consisting of aromatic vinyl block-conjugated diene block-aromatic vinyl block wherein the conjugated diene moiety is hydrogenated, and (b) a block copolymer of the following formula A or B which consists of aromatic block-conjugated diene block wherein the conjugated diene moiety is hydrogenated $$A=(S-D)_N \text{ or } B=(D-S)_N-D$$

in which
S: aromatic vinyl block
D: conjugated diene block
N: an integer of from 1 to 5.

DESCRIPTION OF THE PREFERRED EMBODIMENTS

The tri-block copolymer (a) and the block copolymer A or B (b) used in the present invention each should preferably have a rate of hydrogenation of at least 30%, preferably at least 40% and more preferably at least 70%. If the hydrogenation rate is smaller, the pressure sensitive adhesive composition comprised of these polymers as a base polymer becomes deficient in thermal stability when melted. In addition, such a composition suffers a considerable degree of deterioration upon irradiation with UV rays and is not improved in weatherability. It will be noted that the rate of hydrogenation used herein is intended to mean a rate of hydrogenation of carbon-carbon unsaturated double bonds in the conjugated dienes contained in the respective block copolymer. This rate can be determined by measuring an iodine value prior to the hydrogenation and an iodine value after the hydrogenation and calculating a ratio by percent of the latter value to the former value.

The hydrogenated tri-block copolymers (a) consisting of aromatic vinyl block-conjugated diene block-aromatic vinyl block are those hydrogenated tri-block copolymers of block combinations including, for example, styrene block-isoprene block-styrene block, α-methylstyrene block-isoprene block-α-methylstyrene block, styrene block-butadiene block-styrene block, α-methylstyrene block-butadiene block-α-methylstyrene block, and the like. In view of the superiority flexibility and adhesive characteristics at low temperatures the conjugated diene moiety is preferably isoprene.

The molecular weight of the hydrogenated tri-block copolymer is in the range of from 50,000 to 400,000 and the ratio by weight of aromatic vinyl blocks/conjugated diene block is preferably in the range of 5/95 to 40/60.

When the molecular weight of the hydrogenated tri-block copolymer is smaller than 50,000, the adhesive composition comprising the copolymer lowers in cohesion with a considerable lowering of the creep resistance. On the contrary, when the molecular weight exceeds 400,000, preparation of the polymer becomes difficult, coupled with the disadvantage that for melt mixing and application of an adhesive using the polymer, a problem is involved in poor fluidity.

When the weight ratio of aromatic vinyl blocks/conjugated diene block is smaller than 5/95, an adhesive composition obtained by the use of such a polymer unfavorably exhibits a low cohesion with a poor creep resistance. Over 40/60, the resultant adhesive composition unfavorably becomes low in flexibility.

The amount of 1,4-bonds in the hydrogenated tri-block copolymer should preferably be not less than 50%, more preferably not less than 70% and most preferably not less than 85%. If the amount of the 1,4-bonds is lower than 50%, the glass transition temperature Tg increases with a decrease of tackiness, which is unfavorable for use as a pressure sensitive adhesive.

The block copolymer A or B (b) which consists of aromatic vinyl block and conjugated diene block and in which the conjugated diene moiety is hydrogenated is a block copolymer which consists of a moiety formed by polymerization of one or more of conjugated diene monomers such as isoprene, butadiene, piperine and the like and a moiety derived from a polymer of an aromatic vinyl such as, for example, styrene or $\alpha$-methylstyrene. For better adhesion force, isoprene is preferred among the conjugated diene monomers.

The hydrogenated block copolymer A or B (b) has a molecular weight of from 10,000 to 50,000, preferably from 20,000 to 50,000. The ratio by weight of the aromatic vinyl block/conjugated diene block is preferably in the range of from 5/95 to 50/50. The amount of the 1,4-bonds in the conjugated diene moiety is preferably not less than 50%, more preferably not less than 75% and most preferably not less than 85%.

If the molecular weight of the block copolymer A or B (b) is smaller than 10,000, the adhesive characteristics become low with the possibility of bleeding. On the contrary, over 50,000, the improvements in initial tackiness and processability are reduced with the low temperature characteristics being not improved at all.

If the ratio by weight of the aromatic vinyl block/conjugated diene block is smaller than 5/95, the resultant polymer does not show good miscibility with the hydrogenated tri-block copolymer of aromatic vinyl block-conjugated diene block-aromatic vinyl block, resulting in an unfavorable tendency toward bleeding. When the ratio by weight of the aromatic vinyl block/conjugated diene block is larger than 50/50, the resultant pressure sensitive adhesive composition is undesirably impeded in adhesion and flexibility. This drawback becomes more pronounced especially at low temperatures.

When the amount of the 1,4-bonds in the conjugated diene moiety is smaller than 50% or when the amount of the vinyl bonds is over 50%, the glass transition temperature (Tg) of the block copolymer A or B increases. This leads to unfavorable lowerings of adhesive characteristics and flexibility at low temperatures of an adhesive composition comprising the polymer.

When N in the formula is a integer of 6 or over, the resultant polymer becomes poor in miscibility with the hydrogenated tri-block copolymer, with an undesirable possibility of bleeding.

The hydrogenated tri-block copolymer and the hydrogenated block copolymer A or B may contain in the molecular chains or at terminal ends of the molecule functional groups such as a carboxyl group, a hydroxyl group, an acid anhydride and the like.

The block copolymers which have not been hydrogenated yet are readily obtained by anionic polymerization. For instance, the block copolymer is prepared by a process in which a conjugated diene monomer and an aromatic vinyl (e.g. styrene) monomer are successively polymerized using an alkyl lithium such as butyl lithium or an aryl lithium such as styryl lithium as a catalyst, or a process in which the respective monomers are separately subjected to polymerization reaction and the resultant polymers are combined by the use of a coupling agent. In these processes, a solvent which is inert to the catalyst is used and includes, for example, a hydrocarbon such as cyclohexane, toluene or the like. In the anionic polymerization, a so-called randomizer is used to reduce the amount of the 1,4-bonds. For this purpose, N,N,N',N'-tetramethylenediamine is used.

These non-hydrogenated block copolymers may be converted into a hydrogenation product by any known techniques.

As an instance of the hydrogenation reaction, there can be mentioned a process in which there is used a catalyst of a metal such as nickel, palladium, platinum, ruthenium or rhodium supported on alumina, an inhomogeneous catalyst such as Raney-nickel, or a homogeneous catalyst such as a Ziegler catalyst made of a combination of an organic transition metal compound (e.g. nickel naphthenate, cobalt naphthenate, nickel acetylacetonate, cobalt acetylacetonate or the like) and an alkylated product of aluminium, an alkaline earth metal or an alkali metal. The copolymer to be hydrogenated is contacted with a hydrogen gas at a normal temperature to 200° C. under a pressure of a normal pressure to 200 kg/cm$^2$ for 0.1 to 100 hours. The hydrogenation reaction is effected in a state where the block copolymer is thermally melted or dissolved in a reaction solvent. In view of ease in control of the reaction, the solution is preferably used for the reaction. The reaction solvent may be an solvent which is inert to the hydrogenation reaction and is preferably an alicyclic hydrocarbon such as cyclohexane. Aromatic hydrocarbons such as benzene, toluene and the like may also be used preferably depending upon reaction conditions.

After completion of the hydrogenation reaction, the catalyst is separated and removed from the reaction product by a usual manner to obtain a hydrogenation product of the block copolymer. The hydrogenation product may be used as it is or may be further modified to incorporate polar groups such as a hydroxyl group, a carboxyl group and/or a halogen at terminal ends or side chains of the molecule.

In the pressure sensitive adhesive composition of the invention, the tri-block copolymer (a) which consists of aromatic vinyl block-conjugated diene block-aromatic vinyl block and whose conjugated moiety is hydrogenated and the block copolymer (b) of the formula A or B in which the conjugated diene moiety is hydrogenated are used by mixing at a ratio by weight of 97/3 to 40/60, preferably from 80/20 to 45/55. If the content of the hydrogenated block copolymer A or B is less than 3 wt % low temperature characteristics are not improved significantly. Over 60 wt %, satisfactory adhesive characteristics cannot be obtained, e.g. cohesion at high temperatures lowers.

The pressure sensitive adhesive composition of the invention may further comprise tackifier resins and other additives. If the tackifier resin is used, it is used in an amount of from 30 to 500 parts by weight per 100 parts by weight of the total of the hydrogenated block copolymers, i.e. the hydrogenated tri-block copolymer + the hydrogenated block copolymer A or B. For the purpose of improving processability and fluidity, a process oil may be added as a plasticizer in an amount not impeding the composition of the invention, i.e. in an amount of not larger than 200 parts by weight per 100 parts by weight of the total of the block copolymers.

Moreover, antioxidants, UV absorbers and the like additives may be added each in an amount of not larger than 10 parts by weight per 100 parts by weight of the total of the hydrogenated block copolymers in order to improve weatherability, heat resistance, oxidation resistance and the like. Powdery fillers such as calcium carbonate, titanium oxide and the like, and fibrous fillers such as glass fibers, organic reinforcing fibers and the like may be added to the composition, if desired.

When added to the pressure sensitive adhesive composition, the tackifier resin contributes to make up an adhesive which is well balanced in three major characteristics of the adhesive including tackiness, adhesion and holding power. Accordingly, the type and amount of tackifier resin may be arbitrarily selected in the ranges defined above depending upon the purpose and the type of adherend.

The tackifier resins may be broadly classified into natural and synthetic resins. Examples of the natural resins include rosin resins such as rosin, gum rosin, tall oil, hydrogenated rosin, maleic rosin and the like, and terpene resins and aromatic hydrocarbon-modified terpene resins mainly composed of terpene phenolic resin, α-pinene, β-pinene, limonene and the like. Examples of the synthetic resins include aliphatic, alicyclic and aromatic petroleum resins, cumarone-indene resin, styrene resins, and phenolic resins such as alkylphenol resins and rosin-modified phenol resins, xylene resins and the like. All these tackifier resins may be added to the hydrogenated block copolymers, of which hydrogenated rosin and styrene resins are preferred.

The hydrogenated tri-block copolymer, hydrogenated block copolymer A or B and, optionally, other additives may be mixed by means of a kneader ruder, an extruder, a mixing roll, a Banbury mixer or the like at a temperature of from 110° to 220° C.

The pressure sensitive adhesive composition of the invention is used in a molten state by application onto a substrate or base such as paper, cellophane, polypropylene, polyester and the like sheets. In some cases, the composition may be dissolved in a solvent such as toluene and mixed to obtain a solution, followed by application onto the base to obtain an adhesive article.

The present invention is described in more detail by way of examples.

REFERENCE

Styrene and isoprene were successively added and polymerized by the use of a secondary butyl lithium catalyst to obtain styrene-isoprene block copolymers (SI) and styrene-isoprene-styrene tri-block copolymers (SIS) having physical properties including a molecular weight and a styrene/isoprene ratio as shown in Table 1. The molecular weight of the respective polymers was determined according to the GPC method and the styrene/isoprene ratio and the amount of 1,4-bonds were determined by the use of an IR absorption analysis. As a standard for the analysis, polymers of isoprene and styrene obtained by the above procedure were used.

These isoprene copolymers were each dissolved in cyclohexane in an autoclave to obtain a 20 wt % solution. 2 wt % of a palladium (5 wt %)-on-carbon catalyst was added to and dispersed in the solution, followed by feed of hydrogen to a pressure of 50 kg/cm$^2$ and hydrogenation reaction at 50° C. After completion of the reaction, the catalyst was separated by filtration and the resultant product was dried in vacuum to obtain a hydrogenation product of the block copolymer. The rate of hydrogenation determined by measurement of an iodine value is shown in Table 1.

The respective polymers were subsequently allowed to stand in air at 120° C. for 12 hours to check degrees of coloration and stickiness. The results are shown in Table 1 as a heat resistance at 120° C.×12 Hrs.

Moreover, the polymers were each subjected to an outdoor exposure test for 1 month according to the method prescribed in JIS A 1410 to check degrees of coloration and stickiness of the polymer for evaluation of weatherability of the respective polymers. The results are shown in Table 1.

TABLE 1

| | Polymer used | | | | | |
|---|---|---|---|---|---|---|
| Sample No. | Block Form | Molecular Weight (× 10$^4$) | Styrene/Isoprene Ratio by weight | Rate of Hydrogenation (%) | Amount of 1,4 Bonds (%) | Heat resistance at 120° C. × 12 Hrs | Weatherability |
| SIS-4 | T | 15.4 | 15/85 | 40 | 91 | O | O |
| SIS-1 | " | 13.0 | 13/87 | 97 | 88 | ⊙ | ⊙ |
| SIS-3 | " | 15.5 | 14/86 | 25 | 89 | X | X |
| SIS-2 | " | 15.8 | 15/85 | 0 | 89 | XX | XX |
| SIS-5 | " | 4.5 | 18/82 | 95 | 88 | ⊙ | ⊙ |
| SIS-7 | " | 43.2 | 19/81 | 93 | 90 | ⊙ | ⊙ |
| SIS-9 | " | 15.2 | 4/96 | 96 | 89 | ⊙ | ⊙ |
| SIS-11 | " | 15.6 | 45/55 | 93 | 88 | ⊙ | ⊙ |
| SIS-8 | " | 35.6 | 19/81 | 96 | 88 | ⊙ | ⊙ |
| SIS-6 | " | 6.1 | 17/83 | 97 | 89 | ⊙ | ⊙ |
| SIS-10 | " | 15.3 | 7/93 | 96 | 88 | ⊙ | ⊙ |
| SIS-12 | " | 16.2 | 35/65 | 97 | 89 | ⊙ | ⊙ |
| SI-1 | D | 2.4 | 20/80 | 95 | 89 | ⊙ | ⊙ |
| SI-5 | " | 0.8 | 23/77 | 96 | 90 | ⊙ | ⊙ |
| SI-7 | " | 5.6 | 21/79 | 97 | 90 | ⊙ | ⊙ |
| SI-9 | D | 2.5 | 4/96 | 96 | 88 | ⊙ | ⊙ |
| SI-11 | " | 2.4 | 55/45 | 97 | 89 | ⊙ | ⊙ |
| SI-2 | " | 2.8 | 22/78 | 0 | 89 | XX | X |
| SI-3 | " | 2.6 | 22/78 | 25 | 88 | X | X |
| SI-13 | " | 2.6 | 23/77 | 52 | 40 | O | O |
| SI-8 | " | 4.6 | 21/79 | 95 | 89 | ⊙ | ⊙ |
| SI-4 | " | 2.8 | 22/78 | 33 | 89 | Δ | Δ |
| SI-6 | " | 1.3 | 28/93 | 95 | 88 | ⊙ | ⊙ |
| SI-10 | " | 4.0 | 7/93 | 95 | 88 | ⊙ | ⊙ |

TABLE 1-continued

| | | Polymer used | | | | | |
|---|---|---|---|---|---|---|---|
| Sample No. | Block Form | Molecular Weight ($\times 10^4$) | Styrene/Isoprene Ratio by weight | Rate of Hydrogenation (%) | Amount of 1.4 Bonds (%) | Heat resistance at 120° C. $\times$ 12 Hrs | Weatherability |
| SI-12 | " | 1.8 | 45/55 | 96 | 87 | ◉ | ◉ |

T in the Block Form indicates tri-block copolymer and D indicates di-block copolymer. In the Heat Resistance at 120° C. $\times$ 12 Hrs. and Weatherability, ◉ very good, ○: no coloration and stickiness, Δ: slight degree of coloration and stickiness, X: fair degree of coloration and stickiness, XX: considerable degree of coloration and stickiness.

Subsequently, the tri-block copolymers and the di-block copolymers indicated in Table 1 were blended at predetermined mixing ratios. 100 parts by weight of each blend was mixed with 100 parts by weight of a tackifier resin (YS-PX 1000 available from Yasuhara Yushi Kogyo Co., Ltd.) and 1 part by weight of an antioxidant (Irganox available from Ciba-Geigy) in a melt mixing vessel at 200° C. for 20 minutes to obtain a pressure sensitive adhesive composition. The composition was coated onto a 100 micrometer thick commercially available polyester film by means of a coater at a temperature of 150° C. in a thickness of 40 micrometers to obtain a pressure sensitive adhesive tape. The adhesive tapes obtained by the above procedure was evaluated according to the following methods.

(1) Coating Properties

The melt viscosity of the adhesive composition at 160° C. was measured by means of the Brookfield viscometer. The melt viscosity has an interrelation with the coating properties and was used as an index for the coating properties.

| Melt Viscosity (cps, 160° C.) | Coating Properties | |
|---|---|---|
| less than 25,000 | very good | ◉ |
| 25,000–40,000 | good | ○ |
| 40,000–70,000 | slightly poor | Δ |
| 70,000–100,000 | poor | X |
| larger than 100,000 | very poor | XX |

(2) Adhesive Characteristics

Measured according to the method prescribed in JIS Z 0237.

With regard to the ball-tacking, a larger value indicates a better tacking property. The low temperature tacking property was determined by measurement of ball-tacking at 10° C.

The holding power was determined by a method in which a 1 kg weight was loaded on an attached portion of two adhesive pieces with an attached area of 25 mm $\times$ 25 mm, followed by allowing to stand at 25° C. or 40° C. to determine a time before dropping of the weight. A longer holding time leads to a better holding power (creep resistance).

The adhesion was determined by attaching each adhesive tape on a 1 mm thick stainless steel sheet or polyethylene sheet and subjected to measurement of a 180° peeling force.

(3) Heat Resistance

Each adhesive tape was allowed to stand in air of 120° C. for 12 hours, after which degrees of coloration and stickiness at the adhesive portion were observed and checked.

(4) Weatherability

Each tape was subjected to an outdoor exposure test according to the method prescribed in JIS A 1410 for one month, after which degrees of coloration and stickiness at the adhesive portion was checked.

(5) Bleeding

Each adhesive tape was attached on a Japanese paper and heated at 70° C. for 2 weeks, after which the presence or absence of bleeding into the Japanese paper was checked.

EXAMPLES 1–20 AND COMPARATIVE EXAMPLE 1

Adhesive compositions indicated in Table 2 were evaluated according to the above methods with the results shown in Table 2.

TABLE 2

| | Example 1 | Comparative Example 1 | Example 2 | Example 3 | Example 4 | 5 | 6 |
|---|---|---|---|---|---|---|---|
| Polymer Used For Formulation Combination of Tri and Di-block Copolymers | SIS-1/SI-1 | SIS-2/SI-2 | SIS-3/SI-3 | SIS-1/SI-3 | SIS-3/SI-1 | SIS-4/SI-4 | SIS-8/SI-8 |
| Mixing Ratios of Tri and Di-block Copolymers (wt %) | 70/30 | 70/30 | 70/30 | 70/30 | 70/30 | 70/30 | 70/30 |
| Amount of Polymer in Adhesive (Parts) | 100 | ← | ← | ← | ← | ← | ← |
| Amount of Tackifier Resin (Parts) | 100 | ← | ← | ← | ← | ← | ← |
| Amount of Antioxidant (Parts) | 1 | ← | ← | ← | ← | ← | ← |
| Coating Properties | ○ | ◉ | ◉ | ○~◉ | ◉ | ○ | Δ |
| Adhesive Characteristics | | | | | | | |
| Ball Tackiness (at 25° C.) | 18 | 19 | 18 | 18 | 19 | 18 | 18 |
| Ball Tackiness (at 10° C.) | 8 | 9 | 9 | 8 | 9 | 7 | 7 |
| Holding Power (at 25° C.) | >120 | >120 | >120 | >120 | >120 | >120 | >120 |
| (Minutes) (at 10° C.) | >120 | >120 | >120 | >120 | >120 | >120 | >120 |
| Adhesion (g/cm) | | | | | | | |
| against stainless steel | 420 | 450 | 430 | 430 | 420 | 410 | 410 |
| against polyethylene sheet | 750 | 780 | 740 | 750 | 730 | 720 | 720 |
| Heat Resistance at 120° C. $\times$ 12 Hrs. | ◉ | XX | X | X~Δ | X | ○~◉ | ◉ |
| Weatherability | ◉ | XX | X | Δ | X | ○~◉ | ◉ |
| Bleeding | ○ | ○ | ○ | ○ | Δ | ○ | ○ |

| | 7 | 8 | 9 | 10 | 11 | 12 | 13 | 14 | 15 | 16 |
|---|---|---|---|---|---|---|---|---|---|---|
| Polymer Used For Formulation Combination of Tri and Di-block Copolymers | SIS-7/SI-7 | SIS-1/SI-6 | SIS-1/SI-5 | SIS-6/SI-1 | SIS-5/SI-1 | SIS-1/SI-1 | SIS-1/SI-1 | SIS-1/SI-1 | SIS-1/SI-1 | SIS-1/SI-12 |

TABLE 2-continued

| Mixing Ratios of Tri and Di-block Copolymers (wt %) | 70/30 | 70/30 | 70/30 | 70/30 | 70/30 | 95/5 | 98/2 | 45/55 | 35/65 | 70/30 |
|---|---|---|---|---|---|---|---|---|---|---|
| Amount of Polymer in Adhesive (Parts) | 100 | ← | 100 | ← | ← | 100 | ← | ← | ← | ← |
| Amount of Tackifier Resin (Parts) | 100 | ← | ← | 100 | ← | ← | ← | 100 | ← | ← |
| Amount of Antioxidant (Parts) | 1 | ← | ← | 1 | ← | ← | ← | 1 | ← | ← |
| Coating Properties | XX | ⊙ | ⊙ | ⊙ | ⊙ | Δ | Δ~X | ⊙ | ⊙ | O |
| Adhesive Characteristics | | | | | | | | | | |
| Ball Tackiness (at 25° C.) | 17 | 18 | 19 | 18 | 17 | 18 | 16 | 19 | 19 | 18 |
| Ball Tackiness (at 10° C.) | 7 | 8 | 9 | 8 | 8 | 8 | 6 | 9 | 9 | 6 |
| Holding Power (at 25° C.) | >120 | 110 | 106 | 100 | 60 | >120 | >120 | >120 | 62 | >120 |
| (Minutes)   (at 10° C.) | >120 | 75 | 72 | 70 | 30 | >120 | >120 | 110 | 48 | >120 |
| Adhesion (g/cm) | | | | | | | | | | |
| against stainless steel | 420 | 400 | 360 | 360 | 310 | 370 | 290 | 450 | 290 | 410 |
| against polyethylene sheet | 730 | 670 | 580 | 620 | 550 | 650 | 420 | 750 | 420 | 680 |
| Heat Resistance at 120° C. × 12 Hrs. | ⊙ | ⊙ | ⊙ | ⊙ | ⊙ | ⊙ | ⊙ | ⊙ | ⊙ | O |
| Weatherability | ⊙ | ⊙ | ⊙ | ⊙ | ⊙ | ⊙ | ⊙ | ⊙ | ⊙ | O |
| Bleeding | O | O | X | O | O | O | O | O | O | O~Δ |

| | 17 | 18 | 19 | 20 |
|---|---|---|---|---|
| Polymer Used For Formulation Combination of Tri and Di-block Copolymers | SIS-1/ SI-11 | SIS-1/ SI-4 | SIS-1/ SI-9 | SIS-1/ SI-1 |
| Mixing Ratios of Tri and Di-block Copolymers (wt %) | 70/30 | 70/30 | 70/30 | 70/30 |
| Amount of Polymer in Adhesive (Parts) | 100 | ← | ← | ← |
| Amount of Tackifier Resin (Parts) | 100 | ← | ← | ← |
| Amount of Antioxidant (Parts) | 1 | ← | ← | ← |
| Coating Properties | ~Δ | ⊙ | ⊙ | O~Δ |
| Adhesive Characteristics | | | | |
| Ball Tackiness (at 25° C.) | 13 | 16 | 16 | 11 |
| Ball Tackiness (at 10° C.) | 3 | 5 | 7 | 2 |
| Holding Power (at 25° C.) | >120 | >120 | 88 | >120 |
| (Minutes)   (at 10° C.) | >120 | 80 | 45 | >120 |
| Adhesion (g/cm) | | | | |
| against stainless steel | 400 | 360 | 300 | 350 |
| against polyethylene sheet | 540 | 650 | 610 | 520 |
| Heat Resistance at 120° C. × 12 Hrs. | O | ⊙ | ⊙ | ⊙ |
| Weatherability | O | ⊙ | ⊙ | ⊙ |
| Bleeding | Δ~X | O | Δ~X | Δ~X |

Heat Resistance at 120° C. × 12 Hrs
Weatherability:
⊙; very good
O; good
Δ; slightly poor
X; poor
XX; very poor
Bleeding:
O; no bleeding
Δ; slight degree of bleeding
X; fair degree of bleeding From the results of Table 2, it will be seen that the pressure sensitive adhesive composition using a polymer which is free of hydrogenation (Comparative Example 1) is good with respect to the coating properties and adhesive characteristics, but is not favorable with regard to the heat resistance and weatherability.

What is claimed is:

1. A pressure sensitive adhesive composition which comprises (a) a tri-block copolymer which consists of aromatic vinyl block-conjugated diene block aromatic vinyl block and whose conjugated diene moiety is hydrogenated and (b) a block copolymer of the following formula (D-S)$_N$- D

which consists of an aromatic vinyl block and a conjugated diene block and whose conjugated diene moiety is hydrogenated and in which S is an aromatic vinyl block, D is a conjugated diene block and N is an integer of from 1 to 5.

2. A pressure sensitive adhesive composition according to claim 1, wherein the hydrogenated tri-block copolymer (a) and the hydrogenated block copolymer (b) are used at a ratio by weight of of from 97/3 to 40/60.

3. A pressure sensitive adhesive composition according to claim 1, wherein the hydrogenated tri-block copolymer (a) has a molecular weight of from 50,000 to 400,000.

4. A pressure sensitive adhesive composition according to claim 1, wherein a ratio by weight of the aromatic vinyl block and the conjugated diene block (aromatic vinyl/conjugated diene) in the hydrogenated tri-block copolymer (a) is in the range of from 5/95 to 40/60.

5. A pressure sensitive adhesive composition according to claim 1, wherein the conjugated diene used as the block of the hydrogenated tri-block copolymer (a) is isoprene.

6. A pressure sensitive adhesive composition according to claim 1, wherein the hydrogenated block copolymer (b) has a molecular weight of from 10,000 to 50,000.

7. A pressure sensitive adhesive composition according to claim 1, wherein a ratio by weight of the aromatic vinyl block and the conjugated diene block (aromatic vinyl/conjugated diene) in the hydrogenated block copolymer (b) is in the range of from 5/95 to 50/50.

8. A pressure sensitive adhesive composition according to claim 1, wherein the conjugated diene used as the block in the hydrogenated block copolymer (b) is isoprene.

* * * * *